(12) United States Patent
Shaik (10) Patent No.: US 9,508,260 B2
(45) Date of Patent: Nov. 29, 2016

(54) METHOD TO IMPROVE PARKING SPACE IDENTIFICATION IN AUTONOMOUS DRIVING

(71) Applicant: Toyota Motor Engineering & Manufacturing North America, Inc., Erlanger, KY (US)

(72) Inventor: Faizan Mohammed Shaik, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 11 days.

(21) Appl. No.: 14/530,022

(22) Filed: Oct. 31, 2014

(65) Prior Publication Data

US 2016/0125736 A1 May 5, 2016

(51) Int. Cl.
*G08G 1/14* (2006.01)
*G01C 21/34* (2006.01)

(52) U.S. Cl.
CPC ............ *G08G 1/14* (2013.01); *G01C 21/3407* (2013.01); *G08G 1/146* (2013.01)

(58) Field of Classification Search
CPC ................................. G06Q 10/02; G08G 1/14
USPC ........... 701/117, 410, 414; 340/932.2; 705/5
See application file for complete search history.

(56) References Cited

U.S. PATENT DOCUMENTS

| | | | | |
|---|---|---|---|---|
| 6,421,606 B1 * | 7/2002 | Asai | ................. | G01C 21/3423 701/410 |
| 7,893,847 B2 * | 2/2011 | Shanbhag | ................ | G08G 1/14 340/435 |
| 8,615,351 B2 * | 12/2013 | Ueda | .................... | B60W 10/08 701/300 |
| 2004/0254840 A1 * | 12/2004 | Slemmer | ............... | G06Q 10/02 705/22 |
| 2007/0129974 A1 * | 6/2007 | Chen | ..................... | G06Q 10/02 705/5 |
| 2009/0281727 A1 * | 11/2009 | Nagatani | ........... | G01C 21/3688 701/414 |
| 2011/0133957 A1 * | 6/2011 | Harbach | ................. | G08G 1/14 340/932.2 |
| 2012/0056758 A1 * | 3/2012 | Kuhlman | ................ | G08G 1/14 340/932.2 |
| 2014/0046506 A1 * | 2/2014 | Reichel | ............. | B62D 15/0285 701/2 |
| 2015/0051833 A1 * | 2/2015 | Geelen | .................. | G01C 21/32 701/532 |
| 2015/0353080 A1 * | 12/2015 | Mukaiyama | ............ | E05B 77/54 701/23 |
| 2015/0367845 A1 * | 12/2015 | Sannodo | .............. | B60W 30/06 701/23 |

FOREIGN PATENT DOCUMENTS

JP          2013123922 A     6/2013

OTHER PUBLICATIONS

Kolski et al., Autonomous Driving in Dynamic Environments, Oct. 2006, 8 pages.

* cited by examiner

*Primary Examiner* — Thomas G Black
*Assistant Examiner* — Wae Louie
(74) *Attorney, Agent, or Firm* — Christopher G. Darrow; Darrow Mustafa PC (57) ABSTRACT

A method for parking an autonomous vehicle in a parking lot. The method comprises receiving primary data from a first source and receiving secondary data from a second source. The primary data may include information sufficient to identify a location for one or more of a plurality of parking spaces within the parking lot. The secondary data may include status identifier information for at least one of the plurality of parking spaces. The method includes using the primary data and the secondary data to identify at least one vacant parking space in the plurality of parking spaces, and occupying the at least one vacant parking space.

19 Claims, 4 Drawing Sheets

METHOD TO IMPROVE PARKING SPACE IDENTIFICATION IN AUTONOMOUS DRIVING

TECHNICAL FIELD

The present disclosure generally relates to methods for autonomous driving and, more particularly, to methods for identifying parking spaces in a parking area and driving an autonomous vehicle in a vacant parking space.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Maps, in either printed or digitally displayed form, may often show a parking lot or parking area as a single area, or as an area with representative parking spaces that are for illustrative purposes only, which are not representative of the actual parking spaces within a parking lot. For example, the sizes of the parking spaces are typically not proportional to the remainder of the map content or otherwise to scale such that a vehicle would have enough information to accurately locate an actual parking space within the parking area.

Fully automated driving systems are preferably designed to operate a vehicle on a road without driver interaction or other external control, for example, in self-driving or autonomous vehicles. Advanced driver safety systems may monitor the situation of a vehicle, including its location, as well as a location of other vehicles in its vicinity. Currently, autonomous vehicles may be able to generally identify parking lots and certain vehicles parked within parking spaces when proximate to those vehicles, but they do not have the ability to refer to real-time data or an interactive map of the parking lot, which could potentially be developed and updated to not only identify precise parking space locations, but to indicate vacant and occupied parking space status information. Such parking information is desirable and may be used in a variety of situations. The parking information could be used for predicting the behavior of other vehicles, used in generating a smooth trajectory for path planning after selecting a parking spot, or used for planning and/or reasoning proper vehicle behavior in parking areas.

Accordingly, it would be desirable to provide highly accurate, detailed parking space information with more accuracy and less expended time.

SUMMARY

This section provides a general summary of the disclosure, and is not a comprehensive disclosure of its full scope or all of its features.

In various aspects, the present teachings provide a method for identifying a vacant parking space in a parking lot, and parking an autonomous vehicle. The method may include receiving map data sufficient to identify a location of a plurality of parking spaces within the parking lot. Occupancy status information may be received for at least one of the plurality of parking spaces. The method may include identifying a vacant parking space and creating a trajectory to the vacant parking space in an existing planned path of the autonomous vehicle. The autonomous vehicle may be directed or parked in the vacant parking space.

In other aspects, the present teachings provide a method for parking an autonomous vehicle in a parking lot. The method may include receiving primary data from a first source and receiving secondary data from a second source. The primary data may include information sufficient to identify a location for one or more of a plurality of parking spaces within the parking lot. The secondary data may include status identifier information for at least one of the plurality of parking spaces. The method may include using the primary data and the secondary data to identify at least one vacant parking space in the plurality of parking spaces, and occupying the at least one vacant parking space.

The status identifier information may comprise at least one of an occupancy status and a priority status for one or more of the plurality of parking spaces. The priority status may include at least one of a handicap status, a reserved status, and a limited parking time status. The step of using the primary data and the secondary data to identify at least one vacant parking space may further include determining whether the autonomous vehicle is eligible for a parking space having the priority status. In certain aspects, the step of occupying the vacant parking space includes electing a selected vacant parking space from a plurality of vacant parking spaces identified using the primary data and the secondary data based on an existing planned path of the autonomous vehicle, and creating a trajectory to the selected vacant parking space. The autonomous vehicle may then be directed or parked in the selected vacant parking space.

In still other aspects, the present teachings provide a method for coordinating parking between a plurality of autonomous vehicles in a parking lot. The method may include determining a number and location of parking spaces within a parking lot. Occupancy information may be received for a plurality of the parking spaces. The method may include coordinating an entitlement for at least one vacant parking space based on at least one of priority arrival information, status identifier information of the at least one vacant parking space, and a status of an autonomous vehicle passenger.

Further areas of applicability and various methods of enhancing mapping technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of materials, methods, and devices among those of the present technology, for the purpose of the description of certain aspects. These figures may not precisely reflect the characteristics of any given aspect, and are not necessarily intended to define or limit specific aspects within the scope of this technology. Further, certain aspects may incorporate features from a combination of figures.

DETAILED DESCRIPTION

The following description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple aspects having stated features is not intended to exclude other aspects having additional features, or other aspects incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an aspect can or may comprise certain elements or features does not exclude other aspects of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

The present technology generally relates to autonomous vehicles leveraging parking information from various sources in order to optimize the search for vacant parking spaces within an automobile parking lot, leading to improved parking efficiencies.

Figure 1:
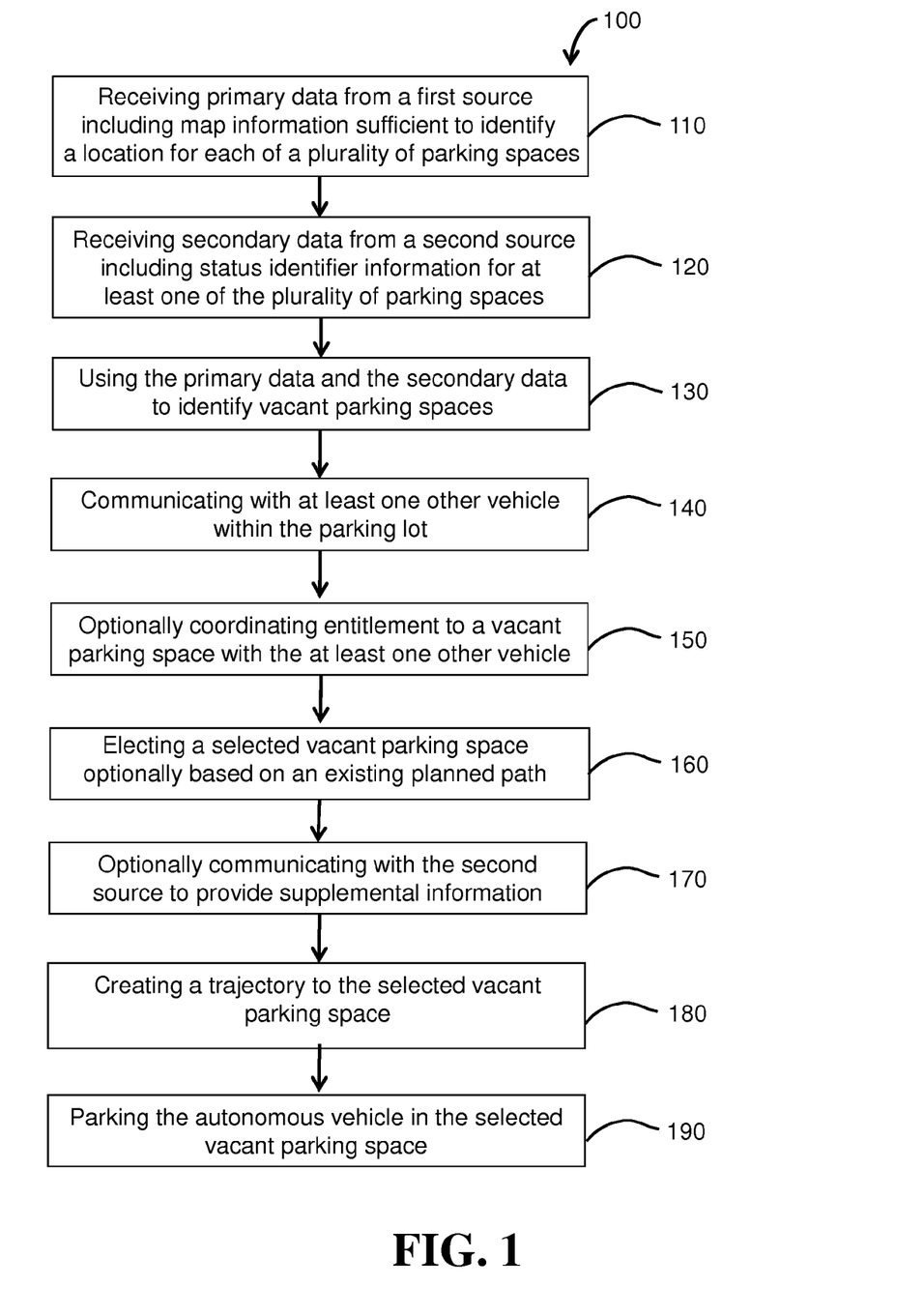
FIG. 1 is a high-level flow chart illustrating a system and method for identifying a vacant parking space in a parking lot and parking an autonomous vehicle.
Figure 2:
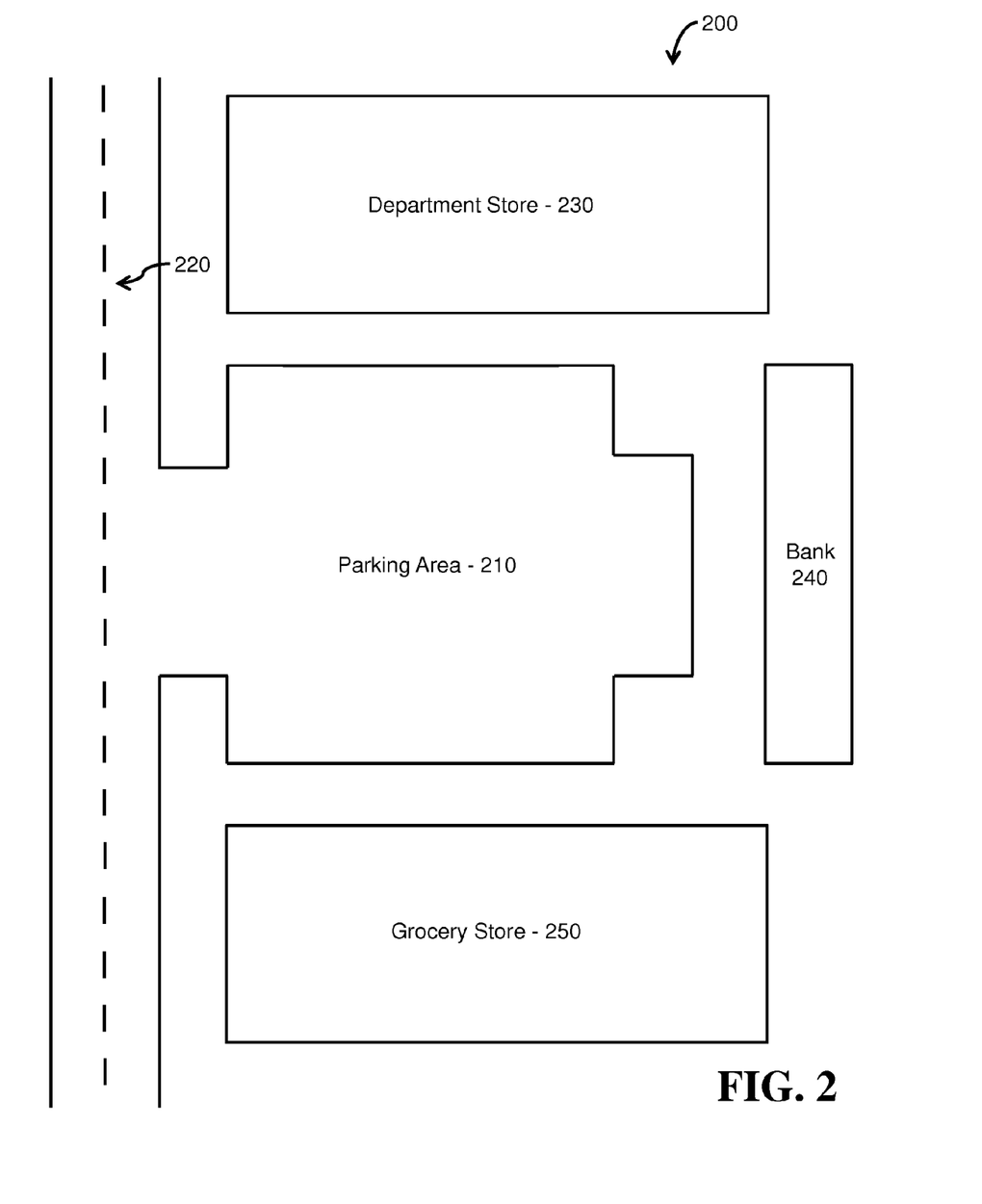
FIG. 2 is a graphical representation illustrating a generic parking area situated near a shopping area adjacent a road.

FIG. 1 is an exemplary flow chart illustrating a system and method 100 for identifying a vacant parking space in a parking lot and ultimately parking an autonomous vehicle. The flow chart of FIG. 1 is a non-limiting example, and does not include each step of the present technology. It should also be understood that the method steps do not have to be carried out in the same order as depicted, and not each method step is required. FIG. 2 is a graphical representation illustrating an exemplary shopping area 200 having a generic parking area 210 situated adjacent a road 220. As shown, the shopping area 200 may include a department store 230, a bank 240, and a grocery store 250. It should further be understood that FIG. 2 is simply a representative diagram showing one configuration of a shopping area and it is envisioned that the present technology may be used with all types of parking areas that may or may not include, for example, shopping areas, businesses, housing developments, or the like. As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc.

In one aspect, and as illustrated in FIG. 1, various methods 100 of the present technology may include receiving primary data from a first source as indicated by method step 110. Many tasks relevant to driver support and semi-automated or autonomous vehicles (such as vehicle detection and tracking, path planning, and control) benefit from the use of high-precision maps. For example, while the map of FIG. 2 generally shows the location of a parking lot 210, it does not show individual parking space locations, which would be helpful for autonomous vehicle parking. Thus, the primary data may include map data, geographical map information, and/or other information sufficient to identify or otherwise determine the number of parking spaces, as well as the location for one or more of a plurality of vehicle parking spaces within a parking lot 210. In certain aspects, or if the primary data is unavailable, the autonomous vehicles may use an algorithm to identify the number of parking spaces that are in the parking lot, as well as their approximate location. For example, algorithms commonly known as SLAM (simultaneous localization and mapping), and their variations, can be used to construct or supplement maps specific for parking spaces. In another example, information may be obtained from various cameras, such as surveillance cameras used to oversee the parking lots. Various maps useful with the present technology can be created or built using computer vision algorithms, specifically by inferring the trajectory/dynamic motion of the vehicles.

Figure 3:
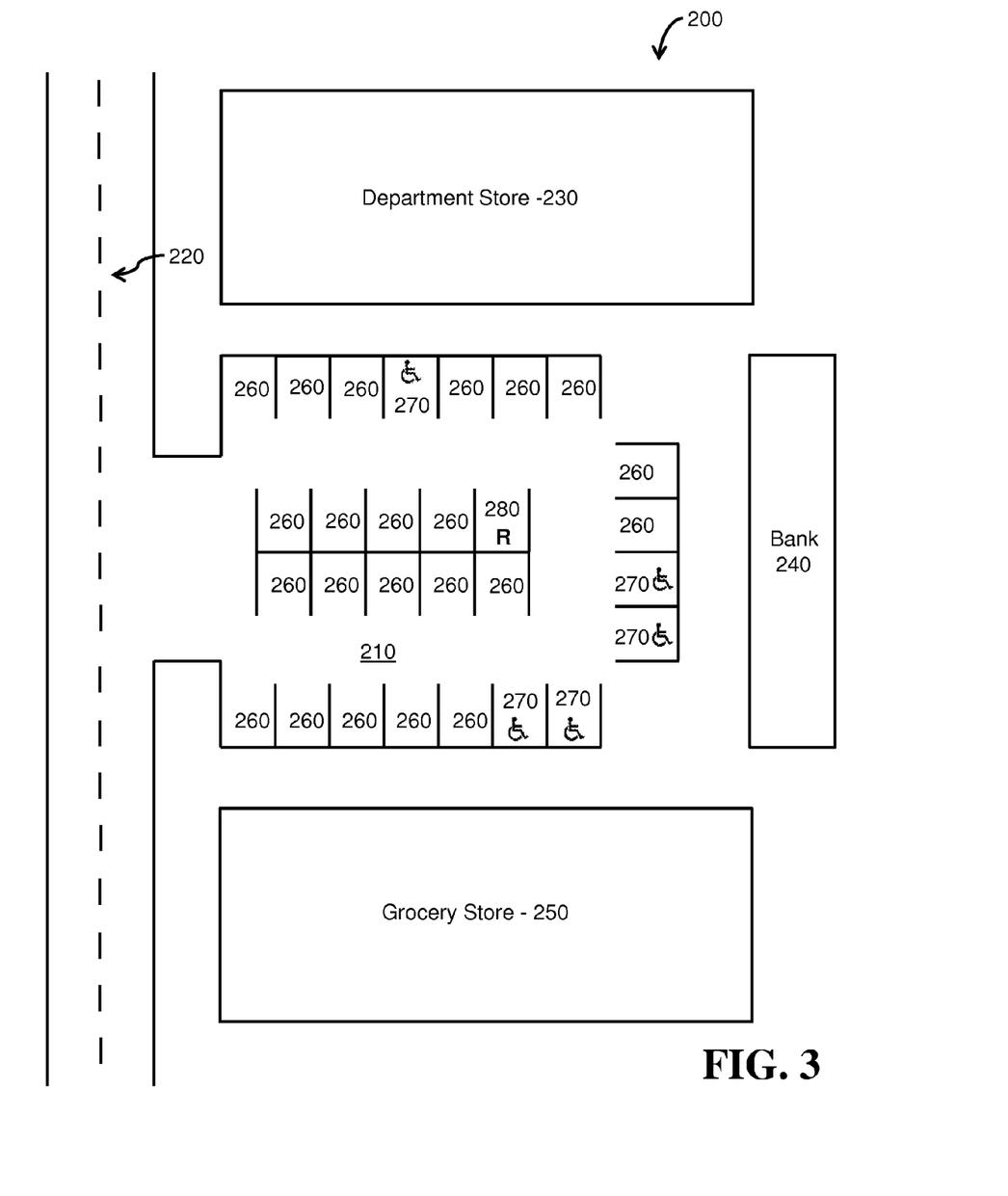
FIG. 3 illustrates the parking area of FIG. 2, with various parking spaces identified and specifically located, including certain spaces labeled with a priority status.

FIG. 3 illustrates the parking area 210 of FIG. 2, with various parking spaces identified and specifically located, including certain spaces labeled with a priority status. Spaces having a normal (non-priority) status are labeled with reference number 260; other spaces are labeled to represent their priority status, such as handicap status 270 and reserved status 280. While FIGS. 2 and 3 indicate parking lines and representative borders of the road, stores, and shopping areas, this is for illustrative and discussion purposes, and data for such a complete map may not be necessary to carry out the present technology. In various aspects, the parking space locations are identified with enough accuracy that the geographical coordinates can be used to direct a vehicle into the respective parking spaces without additional human or driver intervention.

The primary data may be in a variety of formats suitable for use with the autonomous vehicles. In various aspects, the primary data includes map data that can be highly precise digital map information stored in the memory of a database, server, computing device, or external storage, or can be made available from a remote or cloud location, such as by wireless transmission from a digital map data source. Transmissions of data may occur through any known signal, such as cellular, Bluetooth, or wireless internet, etc. The map data preferably includes the existence and the location of each parking space in the parking lot 210. In certain aspects, the number and location of one or more of the parking spaces may also be obtained from and/or verified by a camera or the like, optionally used with software applications.

The first source (providing the primary data) may include any type of computing device, database or storage, server, network, or other control unit/system (local or remote) able to provide data to a computing device, database, or other system available for use with the autonomous vehicle, directly or indirectly. For example, a computing device may be any type of vehicle-installed, handheld, desktop, or other form of single computing device, or can be composed of multiple computing devices. A processing unit in the computing device can be a conventional central processing unit (CPU) or any other type of device, or multiple devices, capable of manipulating or processing information. Memory in the computing device can be a random access memory device (RAM) or any other suitable type of storage device. The memory can include data that is accessed by the CPU using a bus or the like. The memory can also include an operating system and installed applications. The installed applications can include programs that permit the CPU to perform the methods described below. The computing device can also include secondary, additional, or external storage, for example, a memory card, flash drive, or any other form of computer readable medium. The installed applications can be stored in whole or in part in the external storage and loaded into the memory as needed for processing. The computing device can be located remotely from a vehicle in an alternate location (not shown). If the computing device is located remotely from the vehicle, the vehicle can include the capability of communicating with the computing device.

The computing device can also be coupled to active or passive sensor(s) that can capture data and/or signals for processing, for example, from an inertial measurement unit (IMU), a dead-reckoning system, a global navigation satellite system (GPS), a light detection and ranging (LIDAR) system, a radar system, a sonar system, an image-based sensor or camera system, or any other type of system capable of transferring information specific to the environment surrounding a vehicle, including features of the parking area and obstacles therein, entrance and exit information, bike or pedestrian paths, nearby points of interest or store locations, or other localized position data and/or signals and outputting corresponding data and/or signals to the CPU.

In various aspects, the sensors can also capture data representative of changes in x, y, and z-axis position, velocity, acceleration, rotation angle, and rotational angular rate for the vehicle. For example, if the sensors capture data for a dead-reckoning system, data relating to wheel revolution speeds, travel distance, steering angle, and steering angular rate of change can be captured. If the sensors capture signals for a GPS, a receiver can calculate vehicle position and velocity estimated in global coordinates. A plurality of satellites can be used to estimate the vehicle's position and velocity using three-dimensional triangulation and time estimation.

Certain methods may use computer program products accessible from a computer-usable or computer-readable medium providing program or software code that can be used with a computer, computing device, server, remote server, or any other type of execution system. For purposes of this description, and as known to those of ordinary skill in the art, a computer-usable or computer-readable medium can include any device or apparatus that can contain, store, communicate, propagate, or transport the program for use by or in connection with an instruction execution system, apparatus, or device.

In order to identify vacant parking spaces without actually driving by each space and identifying whether or not a vehicle is already present in the parking space, the present teachings provide for the autonomous vehicle to receive information representative of one or more vehicles currently parked in the parking lot. With renewed reference to FIG. 1, method step 120 includes receiving secondary data from a second source. The secondary data may include status identifier information for one or more of the parking spaces. For example, the status identifier information may include an occupancy status, whether the parking space is occupied or vacant, as well as a priority status. The priority status information may optionally or additionally be provided in the primary data set, and in certain aspects, it may be in a separate or tertiary data set. In various aspects, the priority status may indicate a normal parking space or a special parking space. Non-limiting examples of special or prioritized parking spaces may include a parking space designated with a handicapped status, a reserved status for expectant mothers or specific customers or employees, a size status for compact or larger size vehicles, and a limited parking time status for spaces that are metered parking or have parking time limits.

In most instances, but not required, the second source may be a different source from the first source, and may include any source, or combination of sources, as described above with respect to the first source. It is envisioned that the second source may include one or more other vehicles in the parking lot, as well as one or more remote servers or computing devices such as a control system (not shown). With reference to method step 130, the present technology may include using the primary data and secondary data to identify vacant parking spaces within the parking area 210. In one example, an autonomous vehicle may identify the vacant parking spaces by accessing map data of the parking lot (primary data) and information provided by other vehicles in the parking lot (secondary data). In certain aspects, the secondary data information is obtained directly from the other vehicles, for example, via direct communications between active and/or passive sensors 340 of vehicles or objects. In another non-limiting example, vehicle to vehicle communication may include the exchange of the GPS coordinates of the vehicles, optionally with an indication whether the vehicles are stationary or moving. Based on the distance between the autonomous vehicle and the adjacent vehicles communicating, the autonomous vehicle can be programmed to estimate the approximate positions of the respective vehicles. Thus, as indicated by method step 140, in various aspects, the autonomous vehicle may communicate with at least one other vehicle in the parking lot 210; the other vehicle may be moving, stationary, or parked. The communications may be a direct communication from vehicle to vehicle, or an indirect communication with an intermediate computing device, server, or the like.

In yet other aspects, at least a portion of the secondary data information may be collected and/or distributed via a remote secondary source, such as a remote server. In various examples, and with reference to method step 170, one or more vehicles in the parking lot may communicate with the second source or an appropriate control system at any time. For example, the communication may include informing the control system when it occupies and leaves a parking space. Vehicles can additionally inform the control system of the status of neighboring parking spaces, confirm data, and share other relevant data, such as an expected parking duration, the number and location of other vehicles discovered within the parking lot also intending to locate a vacant parking space, any obstacles, and any discrepancies or errors discovered with respect to the primary data and/or secondary data. The control system may also receive information from sensors or devices within the parking lot, for example, entrance and exit sensors, scanners, cameras, and the like.

Figure 4:
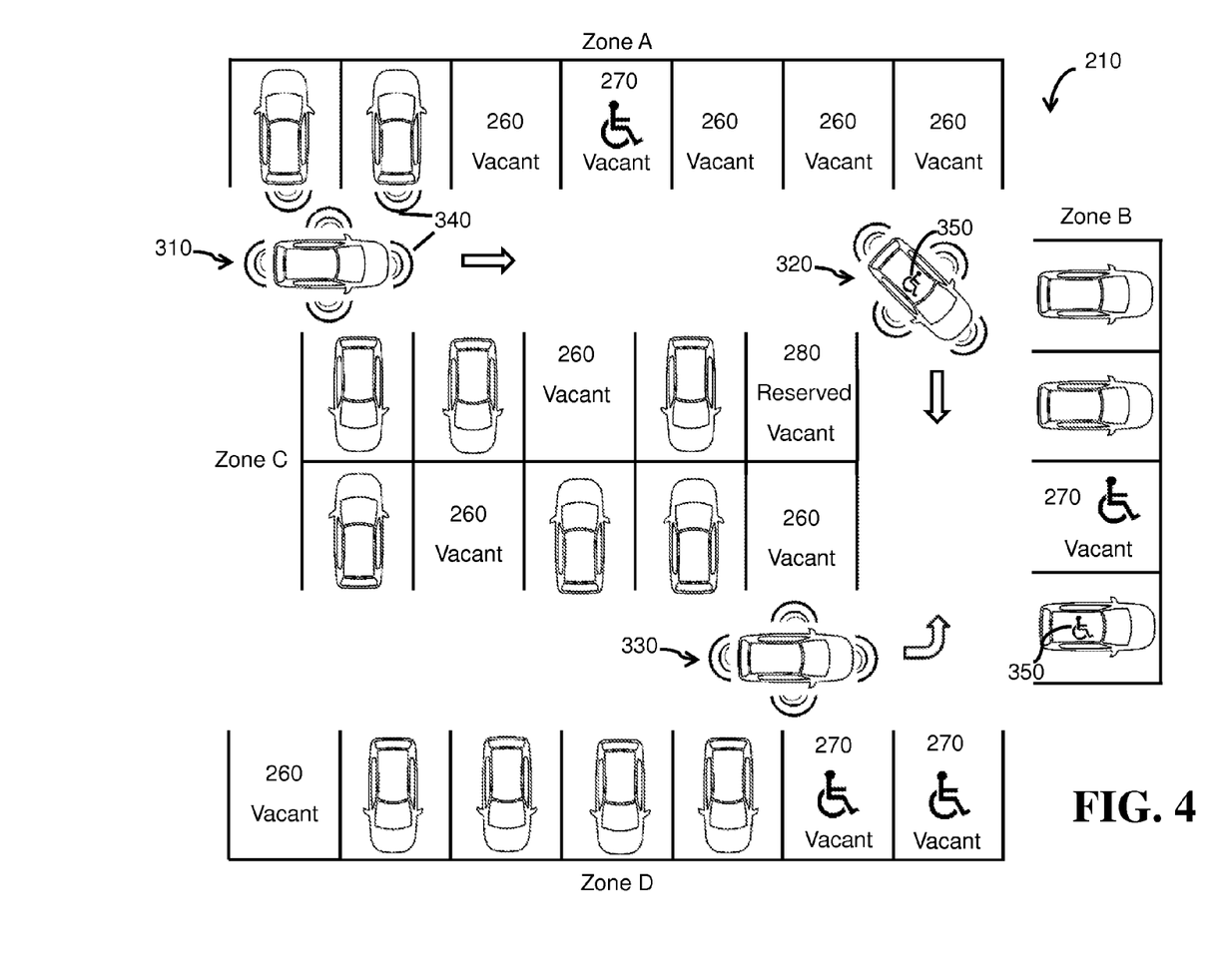
FIG. 4 is a real-time representation of the parking area of FIG. 2 showing occupancy status and priority status of the parking spaces within the parking area, as well as vehicles looking for parking spaces.

FIG. 4 is an example of a real-time representation of the parking area of FIGS. 2 and 3 showing occupancy status of the parking lot 210 separated into four zones: Zone A, adjacent the department store 230; Zone B, adjacent the Bank 240, Zone C, substantially in the center of the parking lot 210; and Zone D, adjacent the Grocery Store 250. In addition to the occupied spaces (which are illustrated on FIG. 4 by a vehicle in the respective parking spaces), various parking spaces 260 are labeled with "Vacant," "Reserved" 280, or shown with a handicapped icon 270. In various aspects, such data is used by the computing system within the vehicle. In other aspects, such data may be visually displayed to a driver or passenger of the autonomous vehicle.

As is common in parking lots, more than one vehicle may be looking for a vacant parking space 260 at a given time. In this regard, FIG. 4 also depicts three vehicles 310, 320, and 330 looking for suitable parking spaces in the parking lot 210. The vehicles 310, 320, and 330 may optionally be provided with an identifier indicating a special status of an autonomous vehicle passenger, if any. For example, vehicle 320 includes an identifier 350 to indicate a passenger having a handicap status, and thus eligible to park in a parking space 270 having a handicap status as its priority status. It is envisioned that similar or alternate vehicle identifiers (not shown) can be used for designating vehicles eligible to use a reserved parking space 280, or the like. Examples of the identifier 350 can be a passive or active sensor, the signal of which can be read by other vehicles, or it can be information that is communicated, transmitted, or otherwise exchanged with a computing device or server, such as the second source.

In various aspects, the methods of the present teachings may include coordinating an entitlement to a vacant parking space with at least one other vehicle, which is illustrated on FIG. 1 as method step 150. With reference to FIG. 4, the three moving vehicles 310, 320, and 330 may communicate with one another in order to determine a respective entitlement to at least one of the vacant parking spaces. In one example, the vehicle 320 shown having the handicap identifier 350 may communicate directly with the other vehicles 310, 330 to share its passenger priority status in order to coordinate and establish its entitlement and/or eligibility for a parking space having a priority status. In another example, a remote or an external control unit/device, such as a remote server or navigation application (not shown), may be used with the vehicles and transfer information via established communication links in order to coordinate entitlement, review priority information and determine eligibility for parking spaces having a priority status, direct vehicles to certain parking spaces, or elect a selected vacant parking spot for at least one vehicle. In one example, vehicle 330 may be closer in proximity to the handicapped parking spaces 270 in Zone D than vehicle 320, but the vehicle 330 is not entitled to park in such spaces. Similarly, vehicle 310 may be closer in proximity to the vacant parking spaces in Zone A, but vehicle 310 may have a later priority arrival status than vehicle 330. The present teachings provide for the coordination of entitlement to a vacant parking space based on at least one of priority arrival information, the status identifier information of the parking space, and a status of an autonomous vehicle passenger. The factors that dictate the coordination of entitlement may be preprogrammed and/or later changed as desired.

In certain aspects, the coordination may also be based on the planned destination of the vehicle passenger, which may be related to the existing planned path of the autonomous vehicle. Thus, electing the selected vacant parking space may be based, at least in part, on a proximity of one or more of the plurality of vacant parking spaces to an existing planned path of the autonomous vehicle. For example, the primary data may further include destination or points of interest information proximate to one or more of the plurality of parking spaces. Specifically, the map data may include information similar to that shown in FIG. 4, namely that the department store 230 is adjacent Zone A, the Bank 240 is adjacent Zone B, and the Grocery Store 250 is adjacent Zone D. The steps of using the primary data and the secondary data to identify at least one vacant parking space may include locating a vacant parking space in close proximity to a predetermined destination or point of interest. More particularly, the passenger in vehicle 310 may intend to visit the grocery store 250, while the passenger in vehicle 330 may intend to visit the department store 230. As such, it may be preferable that vehicle 310 be coordinated to park in a vacant parking space in Zone D instead of the vacant spaces in Zone A, even though vehicle 310 may already be in close proximity to a vacant parking space in Zone A. Similarly, it may be preferable that vehicle 330 be coordinated to park in a vacant space in Zone A instead of in the adjacent vacant space in Zone C.

In still other aspects, the present teachings may also coordinate the allocation of parking spaces based, at least in part, on a time that one or more autonomous vehicle arrived in the parking lot. In this case, one or more autonomous vehicle may be assigned with a priority rank based on arrival time. In this regard, the entitlement may be based on a combination of the priority status of the parking space and the priority rank of the autonomous vehicle. The priority rank may also be determined in combination with the priority status of the vehicle passenger, if any. In other aspects, the priority rank may be based on the movement and/or location of other neighboring vehicles in the parking lot 210 at a given time. With respect to the movement of vehicle 330, it may further be coordinated that vehicle 320 be allowed to park in the vacant handicapped space 270 of Zone B adjacent the Bank 240 before vehicle 330 parks in a vacant parking space 260 in Zone A, such that lanes are not blocked or the parking lot is not otherwise congested with traffic.

With renewed reference to FIG. 1, method step 160 represents the election of a selected vacant parking space. The election may be made by the autonomous vehicle alone, optionally in coordination with another autonomous vehicle, or the election may be assigned by a control device or remote server. In various aspects, the election may be based on an existing planned path and/or target location of the autonomous vehicle as described above.

It should be understood that while the election of a vacant parking space may have originally been based on the best fit for an existing planned path and/or target location at some time, if the planned path is altered, the autonomous vehicle can later select another vacant space that may be in closer proximity to the altered or new planned path.

In various aspects, as represented by method box 170 and discussed above, the methods of the present teachings may also include communicating with the second source to provide supplemental status identifier information. For example, once elected, a vehicle may then communicate with the second source to inform the second source of the selected parking space, or parking space it has ultimately occupied. A similar communication can later be made when the vehicle is leaving the parking space.

Once the vacant parking spaces are identified and, if necessary, entitlement is determined prior to electing a selected parking space, the present teachings provide for the creation of a trajectory to the selected vacant parking space, represented by method step 180. Method step 190 represents parking the autonomous vehicle in the selected vacant parking space.

The foregoing description of the technology has been provided for purposes of illustration and description. It is not intended to be exhaustive or to limit the disclosure. Individual elements or features of a particular aspect are generally not limited to that particular aspect, but, where applicable, are interchangeable and can be used in a selected aspect, even if not specifically shown or described. The same may also be varied in many ways. Such variations should not be regarded as a departure from the disclosure, and all such modifications are intended to be included within the scope of the disclosure.

What is claimed is:

1. A computer-implemented method for parking an autonomous vehicle in a parking lot, the method comprising:
   receiving, using one or more processors, primary data from a first source, the primary data including information sufficient to identify a location for a plurality of parking spaces within the parking lot;
   receiving, using one or more processors, secondary data from a second source, the secondary data including status identifier information for at least one of the plurality of parking spaces, the status identifier information comprising both an occupancy status and a priority status;
   using the primary data and the secondary data to identify, using one or more processors, at least one vacant parking space in the plurality of parking spaces and determining the autonomous vehicle is eligible to use a parking space having the priority status;
   creating a trajectory to the at least one vacant parking space; and
   parking the autonomous vehicle in the at least one vacant parking space.

2. The method according to claim 1, comprising:
   electing a selected vacant parking space from a plurality of vacant parking spaces identified using the primary data and the secondary data;
   creating a trajectory to the selected vacant parking space.

3. The method according to claim 2, comprising:
   electing the selected vacant parking space based on a proximity of one or more of the plurality of vacant parking spaces to an existing planned path of the autonomous vehicle.

4. The method according to claim 1, wherein the status identifier information comprises at least one of an occupancy status and a priority status for each of the plurality of parking spaces.

5. The method according to claim 1, wherein the priority status comprises at least one of a handicap status, a reserved status, and a limited parking time status.

6. The method according to claim 1, wherein the primary data comprises geographical map information indicating one or more parking space location within the parking lot.

7. The method according to claim 1, wherein the primary data further comprises destination or points of interest information proximate to the plurality of parking spaces, and the step of using the primary data and secondary data to identify at least one vacant parking space comprises locating a vacant parking space in close proximity to a predetermined destination or point of interest.

8. The method according to claim 1, further comprising communicating with at least one other vehicle within the parking lot.

9. The method according to claim 8, wherein the at least one other vehicle is occupying one of the plurality of parking spaces.

10. The method according to claim 8, wherein the at least one other vehicle is also searching for a vacant parking space.

11. The method according to claim 10, further comprising:
    coordinating entitlement to a vacant parking space with the at least one other vehicle.

12. The method according to claim 11, wherein the entitlement is based on at least one of (a) priority arrival information, and (b) a status of an autonomous vehicle passenger.

13. The method according to claim 1, further comprising:
    using one or more sensors to communicate with vehicles occupying a parking space or moving vehicles within the parking lot; and
    communicating with the second source to provide supplemental status identifier information for at least one of the plurality of parking spaces.

14. A computer-implemented method for coordinating parking between a plurality of autonomous vehicles in a parking lot, the method comprising:
    determining, using one or more processors, a number and location of parking spaces within the parking lot;
    receiving, using one or more processors, occupancy information for a plurality of the parking spaces;
    coordinating, using one or more processors, an entitlement for at least one vacant parking space based on at least one of (a) priority arrival information, and (b) a status of an autonomous vehicle passenger; and
    directing, using one or more processors, one of the plurality of autonomous vehicles to park in the at least one vacant parking space based on the entitlement.

15. The method according to claim 14, further comprising:
    receiving, using one or more processors, a priority status for at least one of the plurality of the parking spaces.

16. The method according to claim 15, wherein the priority status comprises at least one of a handicap status, a reserved status, and a limited parking time status, and the step of coordinating the entitlement for at least one vacant parking space comprises determining, using one or more processors, whether one or more autonomous vehicle is eligible for a parking space having the priority status.

17. The method according to claim 16, wherein the step of coordinating the entitlement for at least one vacant parking space comprises:
    determining, using one or more processors, a time each autonomous vehicle arrived in the parking lot, and assigning each autonomous vehicle with a priority rank,
    wherein the entitlement is based on a combination of the priority status of the parking space and the priority rank of the autonomous vehicle.

18. The method according to claim 14, wherein the autonomous vehicles communicate directly with one another.

19. The method according to claim 14, wherein the autonomous vehicles communicate with a remote server, and the step of coordinating the entitlement is performed using the remote server.

\* \* \* \* \*